Feb. 26, 1946.  T. R. SCHULTZ  2,395,646
HOSE MENDING TOOL
Filed Oct. 17, 1944  2 Sheets-Sheet 1
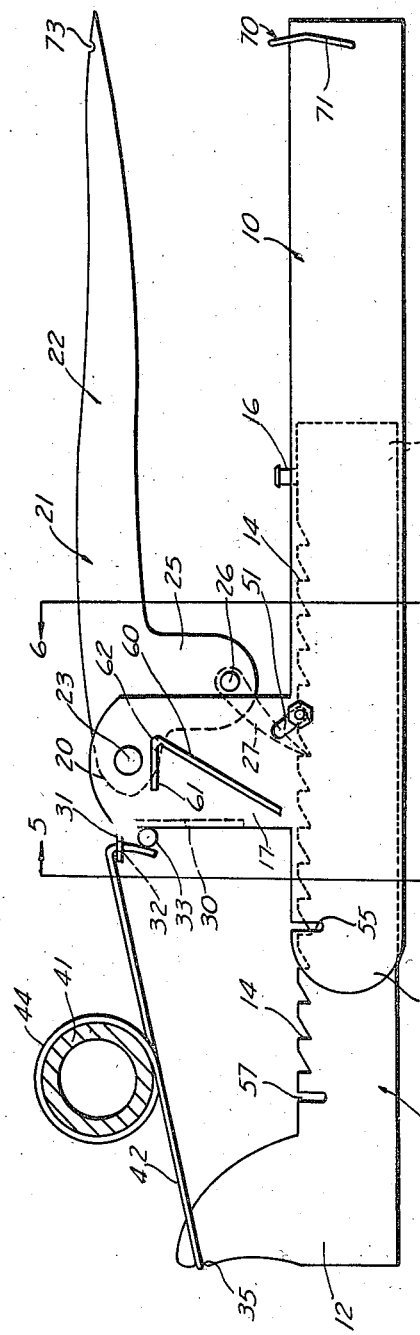
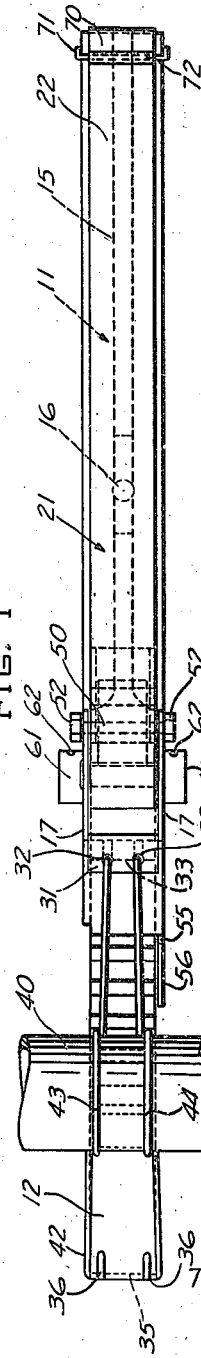
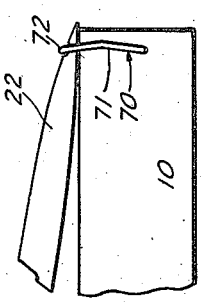
Inventor
Theodore R. Schultz
By
Attorneys

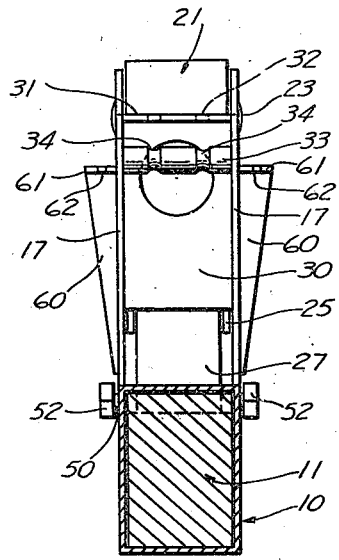

Patented Feb. 26, 1946

2,395,646

UNITED STATES PATENT OFFICE 2,395,646

HOSE MENDING TOOL

Theodore R. Schultz, Oakland, Calif.

Application October 17, 1944, Serial No. 559,051

3 Claims. (Cl. 254—71)

This invention relates to a hose mending tool.

A primary object of this invention is the provision of a tool particularly adapted for use in the mending of rubber hose and the like, provided with means whereby a wire splice on such a hose may be effectively tightened.

Another important object of this invention is the provision of such a device provided with means whereby hose of varying sizes may be accommodated.

Still another object of this invention is the provision of such a device having means associated therewith for cutting the wire at predetermined desired points.

Still another object of this invention is the provision of such a device which will simplify the operation of mending and splicing hose utilizing wire for the purpose.

A still further object is the provision of such a device provided with means for insuring a relatively tight connection of the wire splice utilized in the mending of the hose.

Still another object is the provision of such a device which will be sturdy and durable in construction, reliable and efficient in operation, and relatively simple and inexpensive to operate and manufacture.

Other objects reside in the combinations of elements, arrangements of parts, and features of construction, all as will be more fully pointed out hereinafter and disclosed in the accompanying drawings, wherein there is shown a preferred embodiment of this inventive concept.

In the drawings:

Figure 1 is a side elevational view of one form of device embodying features of this invention, certain concealed parts thereof being indicated by dotted lines, the device being shown in association with a hose to be mended.

Figure 2 is a top plan view of the device of Figure 1, certain concealed parts thereof being indicated by dotted lines.

Figure 3 is a fragmentary detail view showing certain of the parts in different positions of adjustment.

Figure 4 is an end elevational view of the device shown in Figures 1 and 2.

Figures 5 is a sectional view taken substantially along the line 5—5 of Figure 1, as viewed in the direction indicated by the arrows.

Figure 6 is a sectional view taken substantially along the line 6—6 of Figure 1, and viewed in the direction indicated by the arrows.

Figure 7 is an enlarged perspective view of a detail of construction, and

Figure 8 is an enlarged side elevational view of a further constructional detail, certain operating parts being shown in different positions of adjustment.

Like reference numerals refer to like parts throughout the several views of the drawings.

Having reference now to the drawings, there is generally indicated at 10 a casing within which is adapted to be slidably positioned a member 11 comprised of a tightening head 12 and an extending shank 13 provided along its upper surface with ratchet teeth 14. Casing 10 is provided with a longitudinally extending slot 15 through which extends a headed bolt 16 secured to member 11 to preclude the complete withdrawal of the member 11 from the casing 10. Casing 10 is also provided with two upwardly extending lugs 17, between which is pivotally mounted the end 20 of a movable member 21 which includes an elongated handle 22. A pivot pin 23 passing through suitable aligned apertures in lugs 17 and end 20 serves as the pivotal mounting therefor. Pivotally mounted in a suitable recess in a depending portion 25 of member 21, as on a pivot pin 26, is a ratchet dog 27. Ratchet dog 27 is adapted to engage, in a manner and for a purpose to be more fully pointed out hereinafter, with the ratchet teeth 14 on member 10.

Secured between lugs 17, at the ends thereof away from handle 22, is a plate 30 provided with an angularly disposed flange 31, having a pair of perforations or apertures 32 therethrough. Secured to plate 30 below flange 31 is a bar 33 grooved, as at 34 (see Fig. 5), for a purpose to be more fully described hereinafter.

Referring back now to end or head 12 of member 11, it will be seen that the same is provided with a transverse groove 35 across the face thereof and two longitudinally extending grooves 36 in the top portion thereof.

From the foregoing the method of splicing a hose utilizing the tool of the instant invention should now be understandable. The two sections of a hose to be spliced, 40 and 41, are fitted together, or alternatively a sleeve is positioned over the broken ends, and a wire 42 is positioned in groove 35 and then looped about the hose sections to be repaired at two spaced points, as, for example, 43 and 44 (see Fig. 2). The ends of the wires are then brought over flange 31 and bent downwardly through apertures 32 and seated in grooves 34 of rod or bar 33. Up-and-down movement of handle 22 then serves to move dog 27 into and out of engagement with successive ratchet teeth 14, thus forcing the head 12 of member 11 outwardly with respect to casing 10, to effect a relatively great tightening of the loops 43 and 44 about the hose sections.

In some instances when space between the hose encircling wire loops is to be shortened the wire 42 is positioned so that its bight portion rests in the groove 35 and its two ends lie in the grooves 36 after which they are looped about the hose sections 40 and 41 and fastened in the openings 32 in the flange 31 as previously described.

Means are provided for releasing the dog 27 from engagement with an associated ratchet tooth 14 when the loops have been tightened to a sufficient degree. Such means takes the form of a bar 50 adapted to seat in one of the grooves or ratchet teeth 14, which has its ends passed outwardly through angularly disposed slots 51 in lugs 17, and is provided exteriorly of said slots with heads 52 adapted to hold the member 50 in position. It will be readily understood that upward movement of the bar 50 within slots 51 will cause it to engage the under surface of dog 27 and lift the same from its associated ratchet tooth 14, thus permitting the disengagement of the wire 42 from the groove 35 and the apertures 32. After such disengagement, the ends of the wire may be suitably twisted together, or otherwise secured, to hold the parts in related assembly about the hose.

This bar 50 also serves as a keeper for engagement with a tooth 14 immediately behind the tooth which may then be in engagement with the pawl 27 to hold the bar 13 against retraction during the transfer of the pawl 27 from one ratchet tooth 14 to another.

Means are also provided for cutting the wire after the repair operation. Such means take the form of a cutter slot 55 in an extending portion 56 of housing 10. Slot 55 is adapted to be aligned with a transverse groove 57 in member 11 positioned forwardly of the ratchet teeth 14. When it is desired to cut the ends of the wire, the groove 57 is aligned with the cutter slot 55 and the wire 42 positioned therein. Movement of handle 22 now causes relative movement of the groove 57 and cutter slot 55, which occasions the cutting of the wire 42 at a desired point.

Under certain conditions, as, for example, when it is desired to splice a relatively large hose, the spacing of the apertures 32 in flange 31 may not be sufficiently great to permit the wire loops to be adequately separated. Accordingly, to accommodate larger sizes of hose, ears 60 are positioned on the exterior faces of lugs 17, and provided with angularly disposed flanges 61, having apertures 62 therethrough. Accordingly, when it is desired to splice larger sizes of hose or tubing, the wire 42 is, as best shown in Figure 3, bent at its extremity and passed through the apertures 62 in the flange 61, instead of the apertures 32 in the flange 31, thus effecting a relatively greater spacing of the splicing loops.

Means are also provided for holding the parts in a relatively compact unit when the device is not in use for carrying or the like. Such means take the form of a spring clip 70 provided with downwardly extending portions 71 having inturned ends, adapted to engage suitable apertures in the end of casing 10 and adapted to pivot thereabout, provided with a transverse portion 72 extending over and spaced from the top of the casing 10, adapted to engage in a suitable groove 73 positioned adjacent the extremity of handle 22. It will thus be seen that when the transverse portion 72 is seated in groove 73, movement of the handle with respect to the casing is precluded.

From the foregoing it will now be seen that there is herein provided a device accomplishing all the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A hand tool for joining two ends of a hose comprising an elongated housing forming one handle member of the tool, spaced parallel ears projecting upwardly from the housing near its forward end, a wire anchor carried at the forward edges of the ears, a lever pivoted between the ears, a handle carried by the lever and extending toward the rear of the housing in spaced relation thereto, a ratchet pawl pivoted to the lever and projecting toward the housing, a bar slidable in the housing, ratchet teeth on the upper side of the bar for cooperation with the pawl so that when the handle members are oscillated about the pivot the pawl will advance the bar toward the forward end of the housing, and a wire anchor at the forward end of the bar, said wire anchors cooperating in supporting a wire bridging the gap therebetween whereby when the tool is operated the wire will be placed under tension.

2. A hand tool for joining two ends of a hose comprising an elongated housing forming one handle member of the tool, spaced parallel ears projecting upwardly from the housing near its forward end, a wire anchor carried at the forward edges of the ears, a lever pivoted between the ears, a handle carried by the lever and extending toward the rear of the housing in spaced relation thereto, a ratchet pawl pivoted to the lever and projecting toward the housing, a bar slidable in the housing, ratchet teeth on the upper side of the bar for cooperation with the pawl so that when the handle members are oscillated about the pivot the pawl will advance the bar toward the forward end of the housing, a keeper extending transversely of the housing behind the pawl, said keeper being adapted to engage the ratchet tooth immediately behind that engaged by the pawl to hold the bar against retraction during the transfer of the pawl from one ratchet tooth to another and a wire anchor at the forward end of the bar, said wire anchors cooperating in supporting a wire bridging the gap therebetween whereby when the tool is operated the wire will be placed under tension.

3. A hand tool for joining two ends of a hose comprising an elongated housing forming one handle member of the tool, spaced parallel ears projecting upwardly from the housing near its forward end, a wire anchor carried at the forward edges of the ears, a lever pivoted between the ears, a handle carried by the lever and extending toward the rear of the housing in spaced relation thereto, a ratchet pawl pivoted to the lever and projecting toward the housing, a bar slidable in the housing, ratchet teeth on the upper side of the bar for cooperation with the pawl so that when the handle members are oscillated about the pivot the pawl will advance the bar toward the forward end of the housing, a keeper extending transversely of the housing behind the pawl, said keeper being adapted to engage the ratchet tooth immediately behind that engaged by the pawl to hold the bar against retraction during the transfer of the pawl from one ratchet tooth to another, a wire anchor at the forward end of the bar, said wire anchors cooperating in supporting a wire bridging the gap therebetween whereby when the tool is operated the wire will be placed under tension and means to guide the keeper into contact with the pawl when it is moved beyond a predetermined point in order to release the tension on the wire.

THEODORE R. SCHULTZ.